(12) United States Patent
Kojima

(10) Patent No.: US 7,756,468 B2
(45) Date of Patent: Jul. 13, 2010

(54) RELAY APPARATUS AND RELAY METHOD

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 503 days.

(21) Appl. No.: 11/819,992

(22) Filed: Jun. 29, 2007

(65) Prior Publication Data

US 2008/0026692 A1    Jan. 31, 2008

(30) Foreign Application Priority Data

Jul. 28, 2006    (JP)    .............................. 2006-206880

(51) Int. Cl.
    H04B 7/14    (2006.01)
(52) U.S. Cl. ............................ 455/7; 455/9; 455/552.1; 455/502
(58) Field of Classification Search ................ 455/11.1, 455/13.1, 13.2, 16, 15, 574, 552.1, 414.1, 455/414.2, 412.2, 7, 9, 502; 370/328, 311
    See application file for complete search history.

(56) References Cited

U.S. PATENT DOCUMENTS

| 7,060,000 | B2 | 6/2006 | Carlson |
| 7,069,000 | B1 | 6/2006 | Corson et al. |
| 2005/0114492 | A1 | 5/2005 | Arberg |
| 2007/0082621 | A1* | 4/2007 | Lee et al. ...................... 455/69 |

| 2008/0031174 | A1* | 2/2008 | Saifullah et al. ............ 370/311 |
| 2009/0274102 | A1* | 11/2009 | O'Neill ...................... 370/328 |

FOREIGN PATENT DOCUMENTS

| JP | 2005-253062 | 9/2005 |
| WO | WO 03/096588 A2 | 11/2003 |

OTHER PUBLICATIONS

Liebsch G. Renker and R Schmitz, NEC Network Laboratories Europe M: "Paging Concept for IP based Networks" IETF Standard-Working-Draft, Internet Engineering Task Force, IETF, CH, No. 1, Sep. 2001, XP015034320; ISSN: 0000-0004; p. 18, paragraph 5.2.2.—p. 25.
European Search Report EP 07 11 1510; dated Oct. 23, 2007.
Liebsch G. Renker R Schmitz NEC Network Laboratories Europe M: "Paging Concept for IP based Networks" IETF Standard-Working-Draft, Internet Engineering Task Force, IETF, CH, No. 1, Sep. 2001, XP015034320; ISSN: 0000-0004; p. 18, paragraph 5.2.2.—p. 25.

* cited by examiner

*Primary Examiner*—John Lee
(74) *Attorney, Agent, or Firm*—Hanify & King, PC

(57) ABSTRACT

A relay apparatus for managing a base station that connects to a mobile station by wireless is disclosed. The relay apparatus includes: an idle mode detection unit configured to detect that the mobile station is in an idle mode; a renewal execution unit configured to execute a renewal process on behalf of the mobile station in the idle mode by communicating messages necessary for the renewal process with a server; and a timer synchronization unit configured to synchronize timers of the mobile station and the server after the mobile station returns to a normal mode from the idle mode.

18 Claims, 13 Drawing Sheets

FIG.11A

| Type | S | B | D | M | G | r | T | x | Lifetime |
|------|---|---|---|---|---|---|---|---|----------|

Home Address

Home Agent Address

Care-of Address

Identification

Extensions·····

FIG.11B

| Type | Code | Lifetime |
|------|------|----------|

Home Address

Home Agent Address

Identification

Extensions·····

FIG.11C

| Type | Length | SPI |
|------|--------|-----|

| SPI(continued) | Authenticator····· |
|----------------|--------------------|

FIG.12A

| op | htype | hlen | hops |
|----|-------|------|------|
| secs | | xid | |
| | | | flags |
| ciaddr | | | |
| yiaddr | | | |
| siaddr | | | |
| giaddr | | | |
| chaddr | | | |
| sname | | | |
| file | | | |
| options (variable) | | | |

FIG.12B

| Code=50 | Length=4 | Address |
|---------|----------|---------|
| Address (continued) | | |

FIG.12C

| Code=51 | Length=4 | Lease Time |
|---------|----------|------------|
| Lease Time (continued) | | |

FIG.12D

| Code=53 | Length=1 | Type |

FIG.13A

| Management Message Type | Reserved | TLV Encoded Information (Including Renewal Info) ..... |

FIG.13B

| Version=1 | Function Type=7 | Message Type=2 | Flags |
|---|---|---|---|
| Length | | Transaction ID Number | |
| Sequence Number | | | |
| TLVs (Including Renewal Info) | | | |

RELAY APPARATUS AND RELAY METHOD

BACKGROUND OF THE INVENTION

1. Field of the Invention

The present invention relates to a relay apparatus. More particularly, the present invention relates to a relay apparatus managing a base station that is connected to a mobile station by wireless.

2. Description of the Related Art

In recent years, a wireless communication scheme called WiMAX (Worldwide Interoperability for Microwave Access) is being standardized in the IEEE (Institute of Electrical and Electronic Engineers).

In WiMAX, there are IEEE 802.16d (standardized) for non-movable subscriber stations and IEEE 802.16e (being standardized) for movable subscriber stations (to be referred to as mobile stations hereinafter).

WiMAX targeted for the latter movable mobile station supports an idle mode for the purposes of decreasing consumed power of the mobile station and decreasing wireless resources between the mobile station and the base station. A mobile station in the idle mode supplies power only to essential circuits and does not supply power to other circuits to extend battery life.

The mobile station in the idle mode does not register with a particular base station. The mobile station in the idle mode monitors a broadcast message (paging) periodically transmitted by all base stations of a paging group (=paging area) to check if there is traffic to the mobile station periodically.

When the mobile station determines that there is traffic to the own mobile station, the mobile station leaves the idle mode to go into a normal mode, and registers with a particular base station to establish a link between the mobile station and the particular base station. After establishing the link, the base station sends, to the mobile station, traffic addressed to the mobile station to realize incoming call (calling) for the mobile station.

The mobile station includes a mobile IP (MIP) client or includes a DHCP (Dynamic Host Configuration Protocol) client for performing IP (Internet Protocol) communication that is an upper layer of the IEEE 802.16e. According to the standard specification, the mobile station may include either of them.

FIG. 1 is a block diagram showing an example of a conventional network. In the figure, mobile stations 1 and 2 includes a MIP client 3 and a DHCP client 4 respectively. A gateway 5 is a relay apparatus managing a plurality of base stations 6 and 7. The gateway 5 includes a FA (Foreign Agent) 10, a DHCP relay 11 and a PC/LR (Paging Controller/Location Register) 12.

The FA 10 mediates MIP registration/reply messages (to be also referred to as MIP registration request/registration reply messages) between the mobile station including the MIP client 3 and a home agent (HA) 13. The DHCP relay 11 mediates DHCP request/acknowledge messages between the mobile station 2 including the DHCP client 4 and the DHCP server 4. The PC/LR 12 is a functional unit defined in the WiMAX standard for controlling paging and idling.

In FIG. 1, although the gateway and the base station are separated, the function of the base station and the function of the gateway may be integrated in one apparatus. Also in descriptions of embodiments of the present invention hereinafter, the function of the base station and the function of the gateway may be integrated into one apparatus.

Also, although the FA 10, the DHCP relay 11 and the PC/LR 12 are provided in one apparatus in the example shown in FIG. 1, the functions may be distributed to separated apparatuses. Also in descriptions of embodiments of the present invention hereinafter, the functions may be distributed to separated apparatuses.

The mobile station 1 in the idle mode including the MIP client 3 periodically performs MIP registration (MIP renewal process) for keeping a MIP session.

The mobile station 2 in the idle mode including the DHCP client 4 periodically performs DHCP renewal process for keeping a leased address.

At this time, since the mobile station in the idle mode does not establish an uplink connection to the base station, the mobile station needs to leave the idle mode to perform network entry process such as ranging in order to send uplink traffic necessary for performing the MIP/DHCP renewal. In the network entry process, the mobile station registers with the above-mentioned particular base station, and establishes a link between the mobile station and the particular base station.

After performing the MIP/DHCP renewal process, the mobile station returns to the idle mode immediately.

The above-mentioned process for leaving the idle mode is not a process following a call and the like by a user, but is a process periodically performed based on the standard of a control protocol of IP.

In addition, the process is not limited to MIP and DHCP. The process occurs similarly when the mobile station implements a protocol that requires periodic timer updating process.

In addition, when the mobile station implements a protocol that requires periodic timer updating process, there is a server including a timer that is an updating object in relation to the mobile station on a network. In FIG. 1, each of the HA 13 and the DHCP server 14 corresponds to the server.

By the way, a basic reason that such process is required is that the specification of IEEE 802.16e and the specification of IP are defined independently.

Japanese Laid-Open Patent Application No. 2005-253062 (Patent document 1) discloses a method in which, when there are data to be transmitted to a terminal operating in a sleep mode, a base station sends traffic information to the terminal using a TRF_IND message to change the terminal into an active mode.

In the conventional method, the mobile station implementing the protocol that requires the timer updating process needs to leave the idle mode once to go into the normal mode in order to perform the renewal process. Thus, there is a problem in that such method is disadvantageous in view of decreasing consumed power and decreasing wireless resources to be used.

SUMMARY OF THE INVENTION

An object of the present invention is to provide a relay apparatus and a relay method performing the renewal process without leaving the idle mode to enter the normal mode by the mobile station.

According to an embodiment of the present invention, a relay apparatus for managing a base station that connects to a mobile station by wireless is provided. The relay apparatus includes:

an idle mode detection unit configured to detect that the mobile station is in an idle mode;

a renewal execution unit configured to execute a renewal process on behalf of the mobile station in the idle mode by communicating messages necessary for the renewal process with a server; and a timer synchronization unit configured to synchronize timers of the mobile station and the server after the mobile station returns to a normal mode from the idle mode.

According to the present invention, it becomes unnecessary that the mobile station once leaves the idle mode to enter the normal mode for performing the renewal process. Thus, consumed power of the mobile station and wireless resources to be used can be decreased.

BRIEF DESCRIPTION OF THE DRAWINGS

Other objects, features and advantages of the present invention will become more apparent from the following detailed description when read in conjunction with the accompanying drawings, in which:

FIGS. 11A-11C are diagrams for showing formats of MIP registration/reply messages;

FIGS. 12A-12D are diagrams for showing a format of a DHCP message;

FIGS. 13A and 13B are diagrams for showing formats of messages of RNG-REQ (LU flag)/location update request+Renewal Info.

DETAILED DESCRIPTION OF THE PREFERRED EMBODIMENTS

In the following, embodiments of the present invention are described with reference to figures.

According to an embodiment of the present invention, the gateway is provided with an idle proxy client for carrying out the renewal process for the mobile station only when the mobile station is in the idle mode. Thus, it becomes unnecessary that the mobile station once leaves the idle mode to enter the normal mode. By the way, when the function of the gateway is provided in the base station, the idle proxy client is provided in the base station.

<Configuration of a Network According to an Embodiment of the Present Invention>

Figure 1:
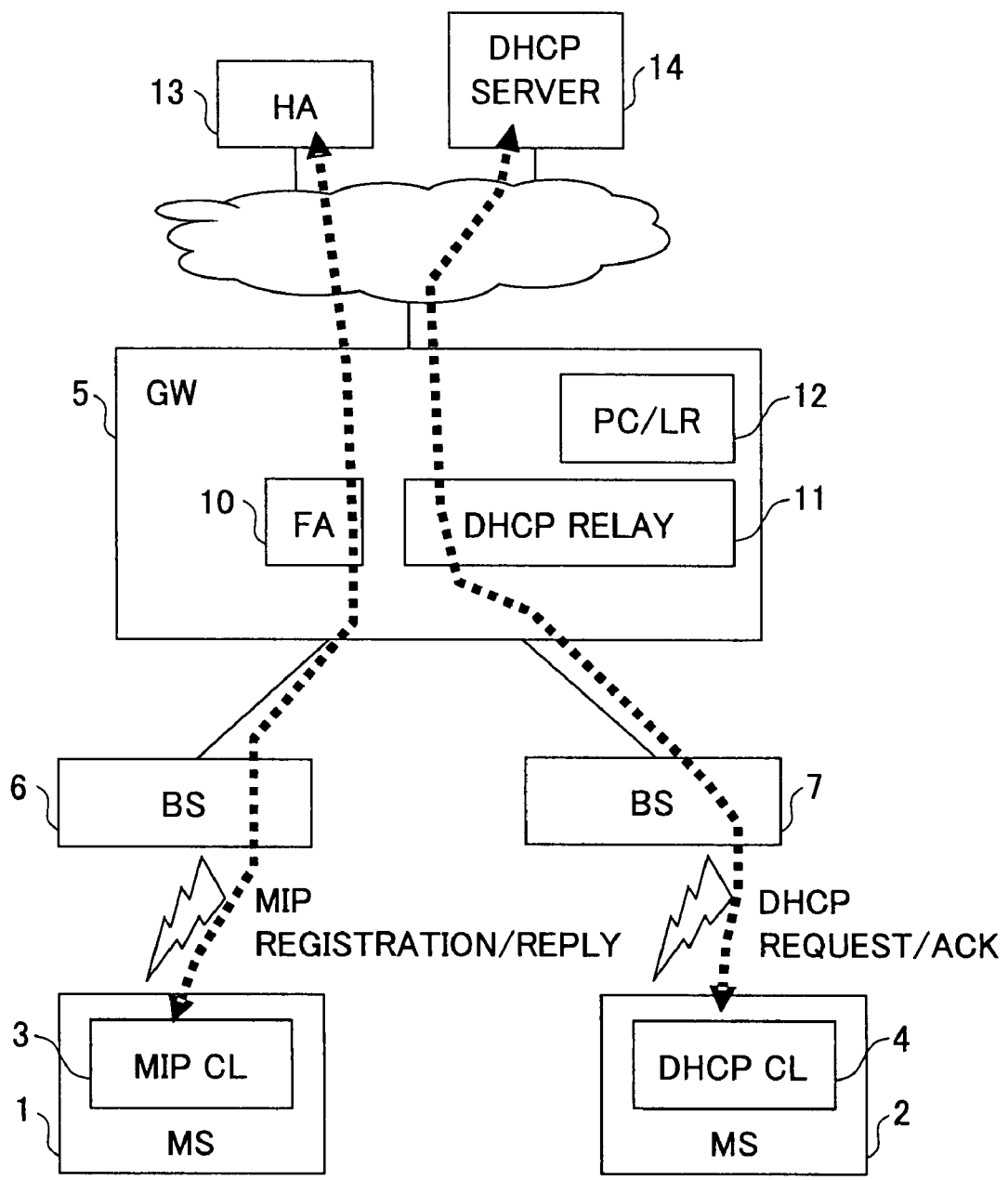
FIG. 1 is a block diagram of an example of a conventional network.
Figure 2:
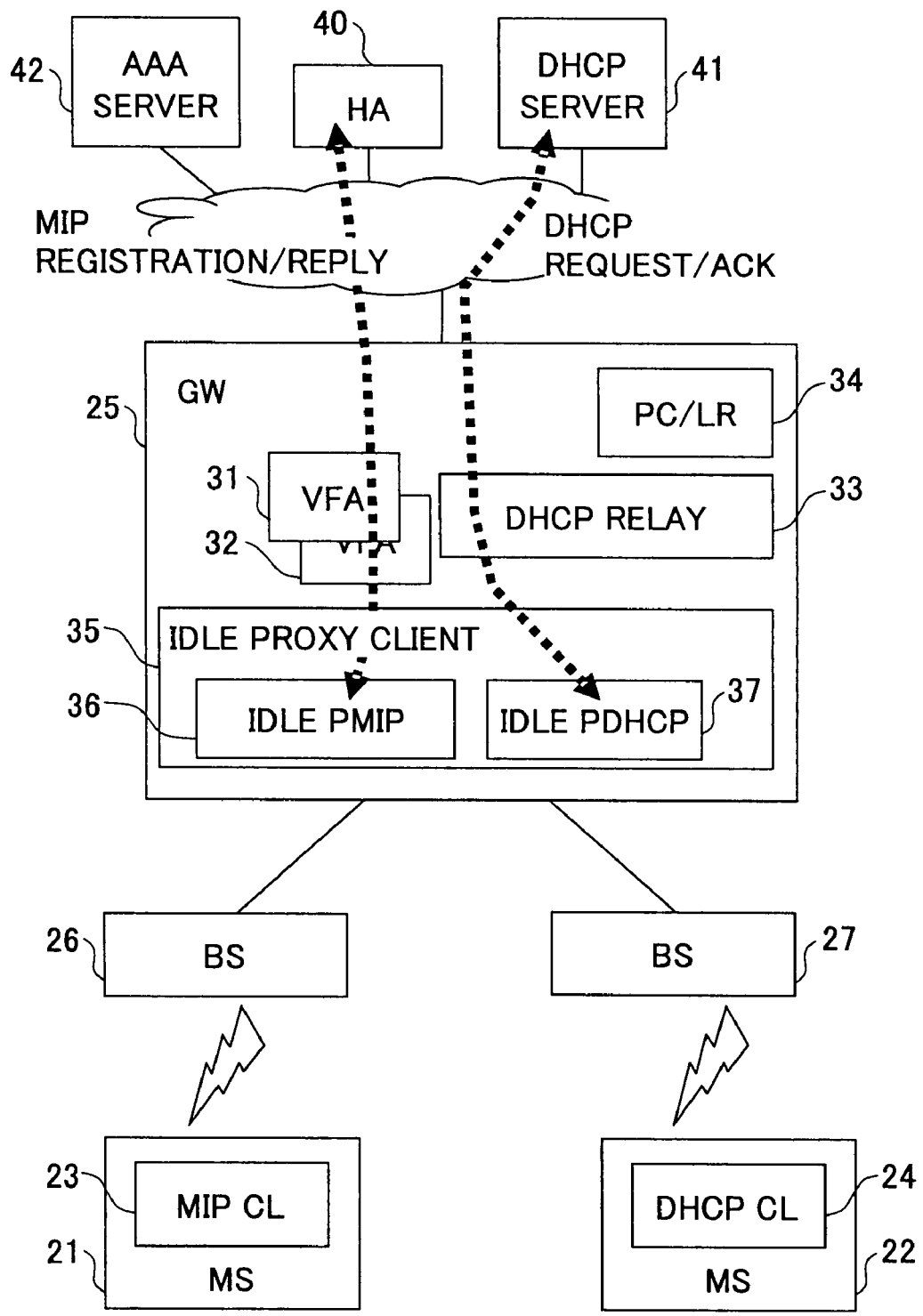
FIG. 2 is a block diagram of a network to which a relay apparatus of an embodiment of the present invention is applied.

FIG. 2 is a block diagram of an embodiment of the network. In the figure, the mobile stations 21 and 22 includes a MIP client 23 and a DHCP client 24 respectively. The gateway 25 is a relay apparatus for managing a plurality of base stations 26 and 27. The gateway 25 includes VFAs (Virtual Foreign Agents) 31 and 32, a DHCP relay 33, a PC/LR 34 and an idle proxy client 35.

The VFA (31, 32) mediates a MIP registration/reply messages between the mobile station 21 including the MIP client 23 and the home agent (HA) 40. The DHCP relay 33 mediates a DHCP request/acknowledge messages between the mobile station 22 including the DHCP client 24 and the DHCP server 41. The PC/LR 34 is a functional block defined by a WiMAX standard for controlling paging and idle. By the way, an AAA (Authentication, Authorization and Accounting) server 42 is for storing information necessary for authenticating the mobile stations 21 and 22.

The idle proxy client 35 performs the renewal process on behalf of the mobile station when the mobile station is idle. The idle proxy client 35 includes an idle proxy for each protocol that requires timer updating process. In the example shown in FIG. 2, the idle proxy client 35 includes an idle PMIP (Proxy Mobile IP client) 36 for performing the MIP renewal process and/or an idle PDHCP (Proxy DHCP client) 37 for performing the DHCP renewal process.

Figure 3:
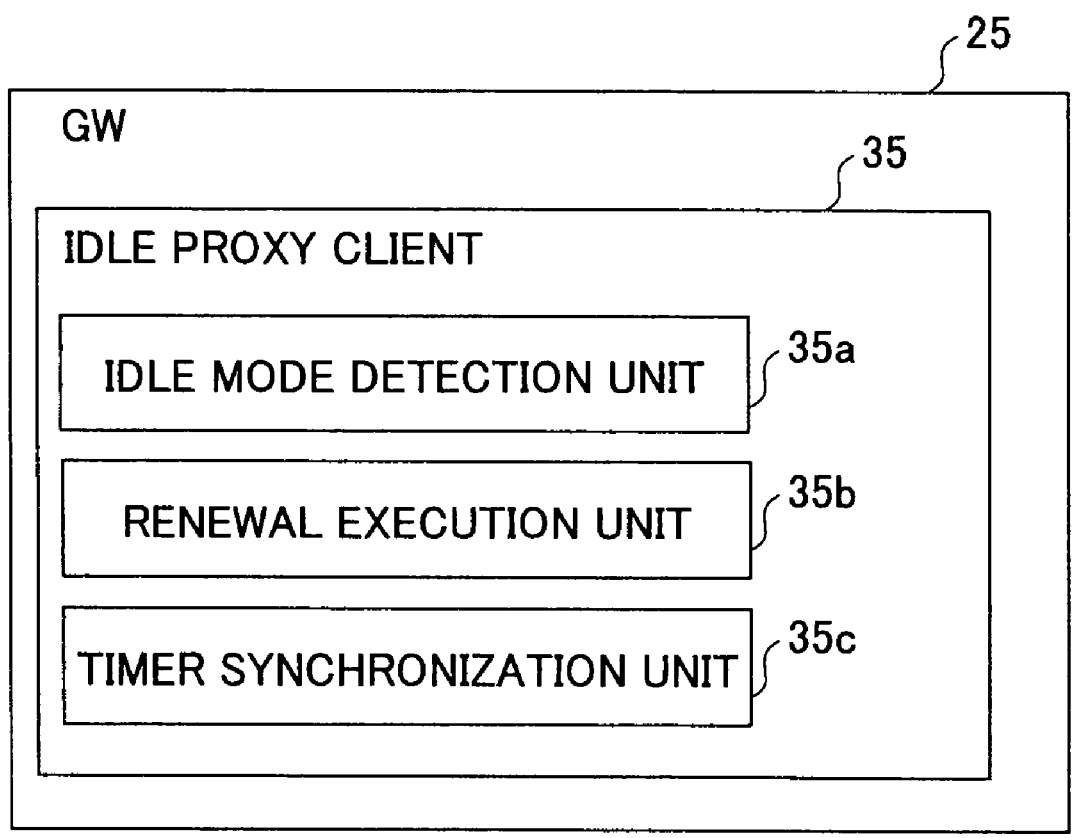
FIG. 3 is a functional block diagram of the relay apparatus of an embodiment of the present invention.

FIG. 3 shows a functional block diagram of a relay apparatus according to an embodiment of the present invention. The relay apparatus includes the idle proxy client 35. The idle proxy client 35 includes an idle mode detection unit 35a, a renewal execution unit 35b and a timer synchronization unit 35c. The idle mode detection unit 35a detects that a mobile station gets into an idle mode and that the mobile station leaves the idle mode. The renewal execution unit 35b periodically communicates a message necessary for renewal with a server when the mobile station is in the idle mode. The timer synchronization unit 35c synchronizes values of timers between the mobile station and the server after the mobile station returns to a normal mode from the idle mode. Accordingly, the renewal process is performed for the mobile station only in the idle mode.

When the idle proxy client 35 detects start of the idle mode, the idle proxy client 35 starts to perform the renewal process for the mobile station. When the idle proxy client 35 detects end of the idle mode, the idle proxy client 35 stops performing the renewal process.

When the mobile station (21 or 22) is in the idle mode, the idle proxy client 35 periodically sends and receives messages necessary for renewal. The idle proxy client 35 not only performs the renewal process in the idle mode on behalf of the mobile station but also synchronizes values of timers between the mobile station (21 or 22) and the server (40 or 41) after the mobile station returns to the normal mode.

For example, assuming that each of a timer of the mobile station and a timer of the server indicates that two minutes are remained just before the mobile station is put into the idle mode. In the idle mode, the timer of the mobile station is not updated, and the idle proxy client 35 performs the renewal process for the mobile station. Therefore, the timer of the server is updated several times. Thus, for example, there is a possibility that the timer of the mobile station indicates two minutes remained and that the timer of the server indicates one minute remained depending on timing of returning to the normal mode.

If this state is left unattended, the timer of the server may be timed out before the mobile station performs the renewal process. Thus, the idle proxy client 35 performs the synchronization process for synchronizing the timers of the mobile station and the server.

First Embodiment

Figure 4:
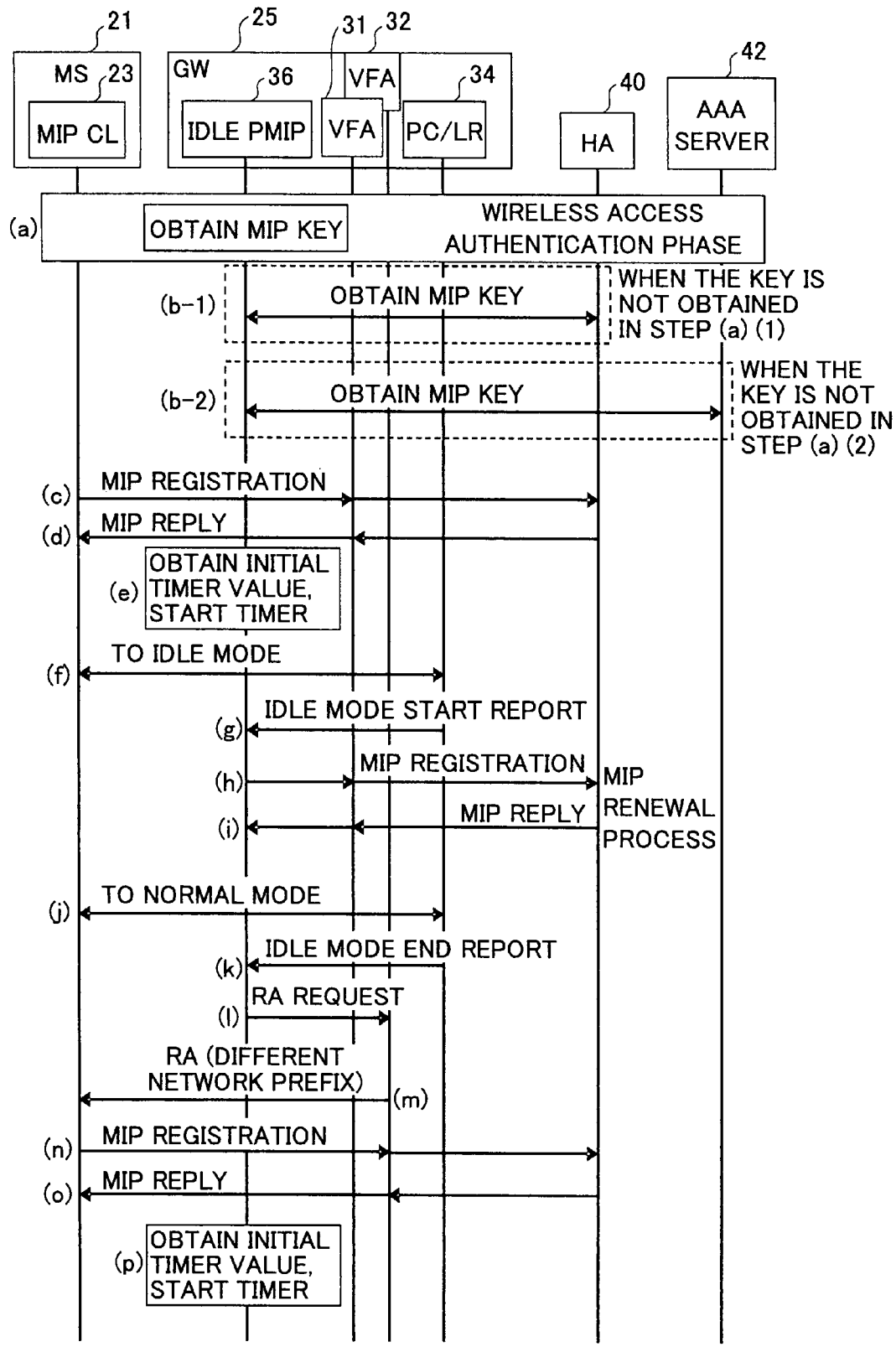
FIG. 4 is a sequence diagram of a first embodiment of the present invention.

FIG. 4 shows a sequence diagram of the first embodiment of the present invention. This embodiment corresponds to a case where the mobile station includes a MIP client. In the figure, the AAA server 42 includes information necessary for authenticating the mobile station 21. Generally, it is necessary to authenticate the mobile station 21 when the mobile station 21 participates in the network. But, authentication may not be performed depending on operation policy of the network. In such a case, the mobile station 21 can participate in the network without authentication.

In the first embodiment, the gateway includes a MIP key obtaining unit for obtaining a MIP key necessary for performing MIP registration/reply that are messages for MIP renewal process.

By the way, it may not be necessary to authenticate MIP registration/reply depending on operation policy of the network. In such a case, it is not necessary to obtain the MIP key.

In addition, the gateway 25 includes an initial timer value obtaining unit for obtaining a timer value at a time before the mobile station 21 goes into the idle mode. The reason for obtaining the timer value at a time before the mobile station 21 goes into the idle mode is for the idle proxy client 35 to specify timing for sending/receiving massages necessary for renewal after the mobile station goes into the idle mode. By the way, the function for obtaining the initial timer value is not an essential function.

In addition, VFAs 31 and 32 are newly provided in the gateway as timer synchronization units for synchronizing timers between the client and the server after returning to the normal mode. The VFAs 31 and 32 advertise router advertisement messages having different network prefixes so that the mobile station 21 is caused to recognize as if it moves and is caused to perform timer synchronization process even though the mobile station 21 does not actually move.

In the following, the embodiment is described with reference to the sequence chart shown in FIG. 4.

Step (a): The idle PMIP 36 that corresponds to the idle proxy client 35 obtains the MIP key in an authentication phase in wireless access defined by WiMAX. The MIP key is a generic name for MIP root key, MN-HA key, FA-HA key and MN-FA key. In the MIP standard, the mobile station is called MN (Mobile Node). The MN-HA key is necessary for authentication between MN-HA in the MIP registration/reply. In the same way, the FA-HA key is necessary for authentication between FA-HA, and the MN-FA key is necessary for authentication between MN-FA.

The MN-HA key, the FA-HA key and the MN-FA key can be also derived from the MIP root key. Each of the MN-HA key, the FA-HA key and the MN-FA key may be obtained independently, or the MIP root key may be obtained. It depends on the operation policy of the network.

Step (b-1): Various methods are defined in the standard as the wireless access authentication method. Thus, there is a possibility that the MIP key is not obtained depending on the authentication method. Thus, the idle PMIP 36 obtains the MIP key from the HA 40 when the MIP key or a part of the MIP key cannot be obtained even though the MIP key is necessary.

As a method for the idle PMIP 36 to obtain the MIP key from the HA 40, the idle PMIP 36 sends a MIP key request message to the HA 40 so that the HA 40 sends a MIP key response message to the idle PMIP 36. The MIP key request/response messages may be realized by extending the MIP standard to define a new type value of an extension header, for example.

As another method, when authentication is necessary between the idle PMIP 36 and the HA 40, IPsec (IP Security protocol) tunnel is established between the idle PMIP 36 and the HA 40 beforehand so that the MIP key request/response messages are sent and received via an IPSec tunnel.

By the way, since it is only necessary to obtain the MIP key, the method for obtaining the MIP key is not limited to the above-mentioned methods.

Step (b-2): Various methods are defined in the standard as the wireless access authentication method of step (a). Thus, there is a possibility that the MIP key is not obtained depending on the authentication method. Thus, as a method different from the step (b-1), the idle PMIP 36 obtains the MIP key from the AAA server 42 when the MIP key or a part of the MIP key cannot be obtained even though the MIP key is necessary.

As a method for the idle PMIP 36 to obtain the MIP key from the AAA server 42, the idle PMIP 36 sends a MIP key request message to the AAA server 42 so that the AAA server 42 sends a MIP key response message to the idle PMIP 36. The MIP key request/response messages may be realized by RADIUS (Remote Authentication Dial In User Service) or DIAMETER that is a standard protocol for accessing the AAA server 42.

By the way, the idle PMIP 36 may obtain from the AAA server 42 a part of the MIP key that is not obtained from the HA 40. Also, the idle PMIP 36 may obtain from the HA 40 a part of the MIP key that is not obtained from the AAA server 42.

Steps (c)-(d): The mobile station 21 in the normal mode sends and receives the MIP registration/reply messages periodically. Also, the mobile station 21 in the normal mode sends and receives the MIP registration/reply messages right after performing wireless access authentication, and right after the mobile station moves to another network. The periodic sending/receiving of the MIP registration/reply message is called MIP renewal process. The sending/receiving of the MIP registration/reply messages performed right after performing wireless access authentication or right after moving to another network is the same as that performed periodically.

According to the specification of MIP, both of the timers of the mobile station and the HA 40 are reset to a same value each time sending/receiving of the MIP registration/reply message is performed.

Step (e): The idle PMIP 36 obtains an initial timer value from the MIP registration/reply messages between the MIP client 23 of the mobile station 21 and the HA 40, in which the initial timer value is a timer value before the mobile station goes into the idle mode. The gateway 25 includes an initial timer value obtaining unit.

The MIP registration/reply messages include a life time field so that the initial timer value can be obtained from the field. After obtaining the initial timer value, the idle PMIP 36 sets an internal timer to be the initial timer value and starts the timer.

Since the MIP renewal process in the steps (c)-(d) is performed periodically, the idle PMIP 36 obtains an initial timer value, sets an internal timer to be the initial timer value and starts the timer each time when the MIP registration/reply messages are sent/received.

Accordingly, after the mobile station 21 goes into the idle mode, the idle PMIP 36 can determine timing for sending/receiving the MIP registration/reply messages first based on the value of the timer. It is only necessary that the idle PMIP 36 sends and receives the MIP registration/reply messages before the timer in it is timed out.

By the way, the function for obtaining the initial timer value is not essential. When the initial timer value is not obtained, the idle PMIP 36 may send and receive the MIP registration/reply messages right after the mobile station 21 goes into the idle mode. In this case, although total number of times of sending and receiving the MIP registration/reply messages increases, the MIP renewal process can be at least performed before the timer of the HA 40 is timed out.

Irrespective whether the initial timer value is obtained or not, the idle PMIP 36 obtains, from the wireless access authentication phase or from the MIP registration/reply in steps (c)-(d), various field values to be stored in a MIP registration message such that the idle PMIP 36 can send the MIP registration message when the idle PMIP 36 performs MIP renewal process on behalf of the mobile station 21.

Step (f): The mobile station 21 goes into the idle mode. Detailed procedure for getting into the idle mode is defined in the standard specification of IEEE 802.16e. Since the Detailed procedure for getting into the idle mode is not directly related to the present invention, detailed description is not provided in this specification.

The PC/LR 34 manages the mobile station in the idle mode.

Step (g): The PC/LR 34 reports to the idle PMIP 36 that the idle mode is started in the mobile station 21. The idle proxy client 35 detects the start of the idle mode by receiving the report from the PC/LR 34.

Steps (h)-(i): The idle PMIP 36 sends and receives the MIP registration/reply messages before the internal timer is timed out based on the timer, and performs the MIP renewal process for the mobile station.

As mentioned above, when the initial timer value is obtained, the idle PMIP 36 performs initial MIP registration/reply after the mobile station goes into the idle mode and before the internal timer is timed out. When the initial timer value is not obtained, the idle PMIP 36 performs the initial MIP registration/reply right after receiving the report of the start of the idle mode after the mobile station 21 goes into the idle mode.

Step (j): The mobile station 21 leaves the idle mode to go into the normal mode. Detailed procedure for leaving the idle mode is defined in the standard specification of IEEE 802.16e. Since the Detailed procedure for leaving the idle mode is not directly related to the present invention, the detailed description is not provided in this specification.

Step (k): The PC/LR 34 reports end of the idle mode to the idle PMIP 36. The idle proxy client 35 detects the end of the idle mode by receiving the report from the PC/LR 34.

By the way, in the sequence shown in FIG. 4, the PC/LR 34 reports the end of the idle mode since the mobile station 21 returns to the normal mode. But, end of the idle mode occurs not only when returning to the normal mode. When the mobile station 21 in the idle mode is switched off or when the mobile station 21 resides in an area where radio waves do not reach for a long time, the mode is not changed to the normal mode so that the mobile stations 21 leaves the network.

When the idle mode ends without entering the normal mode, the idle PMIP 36 stops performing the MIP renewal process and stops managing the mobile station 21 without requesting router advertisement. The idle PMIP 36 determines from a parameter included in the idle mode ending report from the PC/LR 34 whether the end of the idle mode is based on going into the normal mode or not.

Step (1): The idle PMIP 36 requests a VFA different from another VFA, before going into the idle mode, mediating the MIP registration/reply messages of the mobile station 21 to advertise router advertisement information.

Since the VFA 31 mediated the MIP registration/reply messages in steps (c)-(d), the idle PMIP 36 requests the VFA 32 to advertise the router advertisement information.

Step (m): The VFA 32 advertises router advertisement information including a network prefix that is different from one included in router advertisement information advertised by the VFA 31. The network prefix is a network address defined for each subnetwork.

Generally, the mobile station 21 receives a network prefix different from previous network prefix when the mobile station moves and connects to a different network. According to the standard specification, the mobile station 21 sends and receives the MIP registration/reply messages right after the mobile station 21 ascertains that it connects to a different network. By sending and receiving the MIP registration/reply messages, the timers of the mobile station 21 and the HA 40 are reset into a same value.

According to this embodiment of the present invention, the standard specification is diverted. That is, by advertising the router advertisement information including a network prefix different from one used before entering the idle mode, the mobile station is caused to ascertain that the mobile station moves although the mobile station does not move actually so that the mobile station performs the timer synchronization process by using the MIP registration/reply messages.

Thus, the VFAs 31 and 32 for advertising router advertisements including different network prefixes are newly provided in the gateway 25.

By the way, since the router advertisement information is sent with a broadcast address or a multicast address, the router advertisement information is received by mobile stations other than the target mobile station that leaves the idle mode. But, since a point-to-point tunnel can be established between the gateway 25 and the mobile station 21 according to the standard, other mobile stations do not receive the router advertisement information by sending the router advertisement information using the tunnel. Establishment of the point-to-point tunnel between the gateway 25 and the mobile station 21 is defined in the standard.

Steps (n)-(o): Since the router advertisement information including the different network prefix is received by the MIP client 23 of the mobile station 21, the MIP client 23 sends and receives the MIP registration/reply messages.

Step (p): In the same way as the step (e), the idle PMIP 36 obtains an initial timer value, resets a value of the timer included in the idle PMIP 36 to be the initial timer value, and starts the timer. Like the step (e), this process is not essential.

Accordingly, when the mobile station 21 includes the MIP client 23, it becomes unnecessary that the mobile station 21 once leaves the idle mode to go into the normal mode for performing the renewal process.

FIG. 11A shows a format of the MIP registration message, and FIG. 11B shows a format of the MIP reply message. FIG. 11C shows a format of an extension field added to the MIP registration/reply message. There are various extensions. FIG. 11C shows a format of Mobile-Home Authentication Extension, Mobile-Foreign Authentication Extension, and Foreign-Home Authentication Extension among various extensions.

The header shown in FIG. 11A or FIG. 11B follows an IP header and a UDP (User Datagram Protocol) header. In addition, one or more extension shown in FIG. 11C follows as necessary.

In FIG. 11A, "Type" is 1, S/B/D/M/G/r/T/x indicates each of various flags, and "Lifetime" indicates remaining time (second) during which registration is valid. "Home Address" indicates an IP address of the mobile station, and "Home Agent Address" indicates an IP address of a home agent of the mobile station. "Care-of Address" indicates an IP address of an end of the tunnel. In the present embodiment, the Care-of Address is an address of the mobile station or the FA. "Identification" indicates an ID (identifier) set for preventing reply attack. "Extensions" indicate extension fields including some extension messages as necessary.

In FIG. 11B, "Type" indicates 3, "Code" indicates Result Code such as "accepted" and the like. Other items are the same as those shown in FIG. 11A.

In FIG. 11C, Type=32 indicates Mobile-Home Authentication Extension, Type=33 indicates Mobile-Foreign Authentication Extension and Type=34 indicates Foreign-Home Authentication Extension. "Length" indicates a message length (bytes), and "SPI" indicates Security Parameter Index. "Authenticator" indicates a digest of a message calculated using the MN-HA key when the extension is Mobile-Home Authentication Extension. When the extension is Mobile-Foreign Authentication Extension, "Authenticator" indicates a digest of a message calculated using the MN-FA key. When the extension is Authentication Extension, "Authenticator" indicates a digest of a message calculated using the FA-HA key.

By the way, although the message formats are based on MIPv4 as an example in this embodiment, similar updating process can be performed using MIPv6 in which message formats are different.

Second Embodiment

Figure 5:
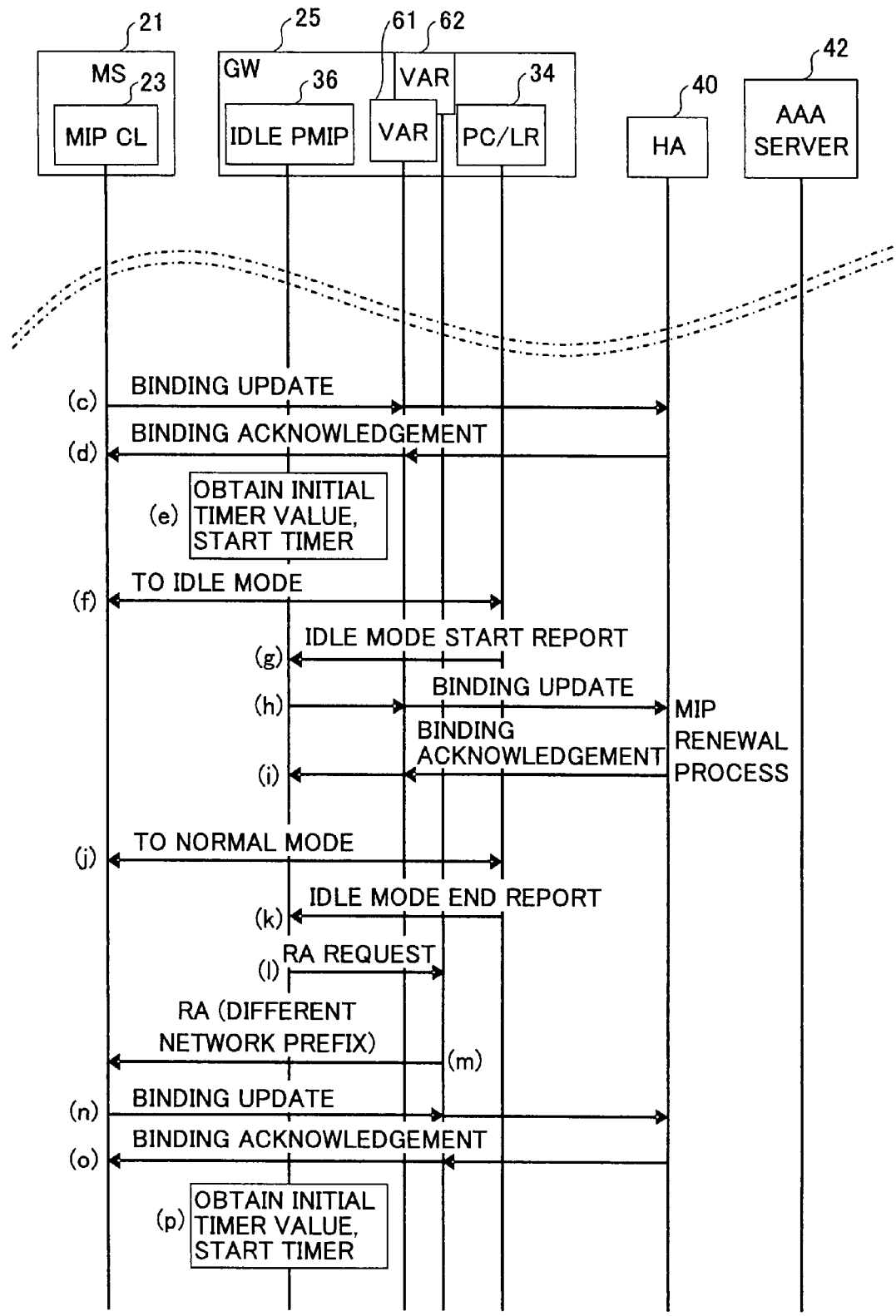
FIG. 5 is a sequence diagram of a second embodiment of the present invention.

FIG. 5 shows a sequence diagram in the second embodiment of the present invention. Like the first embodiment, the mobile station is a MIP client in the second embodiment. Difference from the first embodiment is that the second embodiment uses MIPv6 (Mobile IP version 6) although the first embodiment uses MIPv4 (Mobile IP version 4). Also in the case of MIPv6, an idle PMIP 36 performs the MIP renewal process on behalf of the mobile station 21 in the idle state in the same way as the case of MIPv4. But, following features are different from MIPv4.

According to the MIPv4 standard, FA (Foreign Agent) is defined such that the FA mediates the MIP registration/reply messages. On the other hand, according to the MIPv6 standard, FA is not defined so that FA does not exist in this embodiment. In MIPv6, the MIP registration message and the MIP registration reply message are called binding update message and binding acknowledgement message respectively. Functions of these messages are basically the same as those of the MIP registration/reply messages.

Since FA is not used in MIPv6, an access router (AR) function of the gateway 25, instead of the FA, relays the binding update/acknowledgement messages and advertise the router advertisement (RA) information. Also in the second embodiment, VARs (virtual access routers) 61 and 62 are provided for advertising router advertisement information having different network prefixes.

In MIPv4, both of the destination IP address of the MIP registration sent by the mobile station 21 and the destination IP address of the MIP reply sent by the HA 40 correspond to the FA. On the other hand, in MIPv6, the destination IP address of the binding update sent by the mobile station 21 indicates the HA 40, and the destination IP address of the binding acknowledgment sent by the HA 40 indicates the mobile station 21. The AR performs IP routing without performing termination in IP layer, which is different from the FA that resends the IP packet after terminating the IP session.

Although there are such differences of relay processes between the FA and the AR, since the gateway 25 can refer to the binding update/acknowledgement messages, necessary information can be obtained from the binding update/acknowledgement messages in the same way as the first embodiment.

FIG. 5 only shows sequences related to the binding update/acknowledgment and router advertisement. Except for the already described differences, the sequence is similar to the sequence shown in FIG. 4. Thus, detailed description is not provided.

Accordingly, when the mobile station 21 includes the MIPv6 client, it becomes unnecessary for the mobile station 21 to leave the idle mode to go into the normal mode for performing the renewal process.

Third Embodiment

Figure 6:
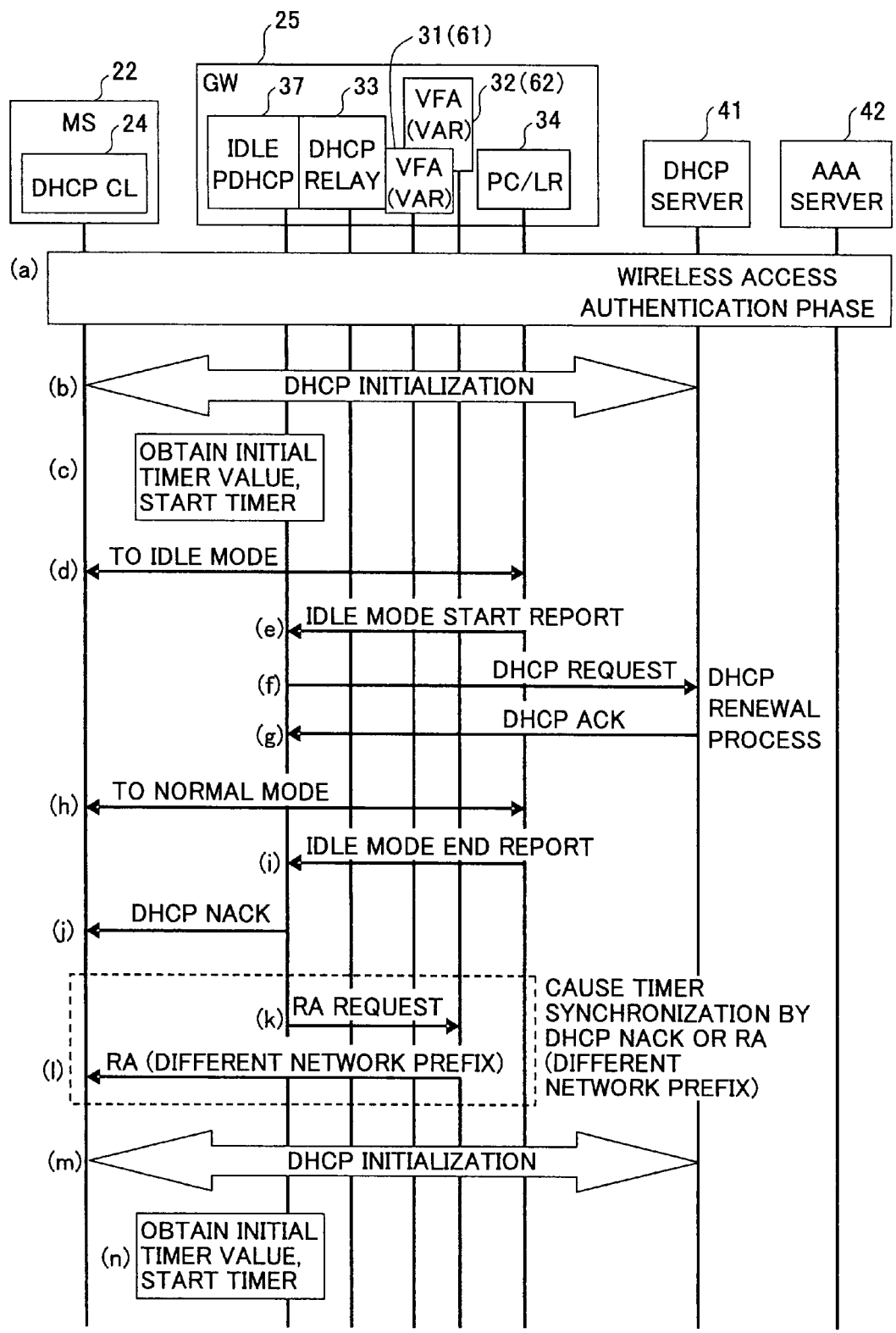
FIG. 6 is a sequence diagram of a third embodiment of the present invention.

FIG. 6 shows a sequence diagram of the third embodiment of the present invention. In the third embodiment, the mobile station is a DHCP client.

As to the third embodiment, differences from the first embodiment are mainly described. In the third embodiment, DHCP request/acknowledgement messages are sent and received for performing the renewal process.

Also in the third embodiment, timer synchronization between the client and the server can be performed by advertising router advertisement information having different network prefixes. In addition to the method, in the third embodiment, the timer synchronization can be performed by sending a DHCP negative acknowledgement message to the mobile station 22 to cause the mobile station 22 to perform timer synchronization process.

In the following, the sequence is described with reference to FIG. 6.

Step (a): Wireless access authentication phase is performed.

Step (b): DHCP initialization is performed between the mobile station 22 and the DHCP server 41. The DHCP server 41 provides an address to the mobile station 22. In the initialization of DHCP, the mobile station 22 sends a DHCP discover message, the DHCP server sends a DHCP offer message as a response, and the mobile station 22 sends a DHCP request message to the DHCP server 41, then, the DHCP server 41 sends a DHCP acknowledgment message as a response. Then, the initialization is completed.

For updating the timer periodically, the mobile station 22 only sends and receives the DHCP request/acknowledgement messages.

Step (c): In the same way as the first embodiment, the idle PDHCP 37 obtains the initial timer value, that is a timer value before the mobile station 22 goes into the idle mode, from a DHCP message between the mobile station 22 (DHCP client) and the DHCP server 41. The initial timer value can be obtained from the lease time field in the DHCP message. Like the first embodiment, it is not essential to obtain the initial timer value.

The idle PDHCP 37 obtains various field values to be stored in a DHCP request in the wireless access authentication phase, in the initialization of DHCP in step (b) or from periodic DHCP request/acknowledgement messages. This is performed irrespective whether the initial timer value is obtained or not such that the idle PDHCP 37 can send the DHCP request when performing DHCP renewal on behalf of the mobile station.

Step (d): In the same way as the first embodiment, the mobile station goes into the idle mode.

Step (e): In the same way as the first embodiment, the PC/LR 34 reports start of the idle mode to the idle PDHCP 37.

Steps (f)-(g): The idle PDHCP 37 sends and receives DHCP request/acknowledgement messages before the timer in the idle PDHCP 37 is timed out to perform the DHCP renewal process for the mobile station 22.

As mentioned above, when the idle PDHCP 37 obtains the initial timer value, the idle PDHCP 37 sends and receives first DHCP request/acknowledgement messages after the mobile station 22 goes into the idle mode and before the timer is timed out. When the idle PDHCP 37 does not obtain the initial timer value, the idle PDHCP 37 sends the first DHCP request message right after receiving the report of the start of the idle mode.

Step (h): In the same way as the first embodiment, the mobile station leaves the idle mode to go into the normal mode.

Step (i): In the same way as the first embodiment, the PC/LR 34 reports the end of the idle mode to the idle PDHCP 37. In the same way as the first embodiment, when the idle mode ends without going into the normal mode, the idle PDHCP 37 stops managing the mobile station 22 without performing timer synchronization process and the like after that.

Step (j): The idle PDHCP 37 sends a DHCP negative acknowledgement message to the mobile station 22.

The mobile station 22 that receives the DHCP negative acknowledgement message ascertains that the address is invalidated, and the mobile station 22 performs DHCP initialization again. Accordingly, the mobile station 22 can perform the timer synchronization process.

In this initialization of DHCP, there is a possibility that only DHCP request/acknowledgement messages are used without using the DHCP discover/offer messages.

Steps (k)-(l): In the same way as the first embodiment or the second embodiment, the timer synchronization process may be performed by advertising the router advertisements having different network prefixes by the VFAs 31 and 32 (or VARs 61 and 62) instead of using the DHCP negative acknowledgement message.

But, different from the cases of MIPv4 of the first embodiment and MIPv6 of the second embodiment, the idle PDHCP 37 requests VFA 31 or 32 (or VARs 61 or 62) to advertise the router advertisement information wherein network prefix of the VFA (or VAR) is different from a network prefix of the address provided to the mobile station 22 by DHCP.

Since the mobile station 22 does not include a MIP client, the mobile station 22 does not send or receive the MIP registration/reply messages and the binding update/acknowledgement messages.

By the way, the idle PDHCP 37 can know a network prefix of an address by referring to upper bits of the address that is provided to the mobile station 22 by DHCP.

Step (m): The mobile station 22 performs initialization of DHCP so that the timer of the mobile station 22 is synchronized with the timer of the DHCP server 41.

Step (n): In the same way as the step (c), the idle PDHCP 37 obtains the initial timer value.

Above-mentioned message names of DHCP corresponds to DHCPv4. Similar messages are also defined in DHCPv6 although names are different. Also in DHCPv6, processes similar to DHCPv4 are performed.

Accordingly, when the mobile station 22 includes the DHCP client 24, it becomes unnecessary that the mobile station 22 once leaves the idle mode to go into the normal mode for performing the renewal process.

FIG. 12A shows a format of the DHCP message. As types of DHCP message, there are DHCP discover, DHCP offer, DHCP request, DHCP decline, DHCP acknowledgement, DHCP negative acknowledgement, DHCP release and DHCP inform. The message format shown in FIG. 12A is common to these types of messages. For each message type, parameter values and options stored in option fields are different.

In FIG. 12A, "op" indicates Message op code/Message type, and "htype" indicates Hardware address type. For example, htype=1 indicates Ethernet. "hlen" indicates Hardware address length. For example, hlen=6 indicates Hardware address length when Ethernet. "hops" indicates an option used by a relay agent, and "xid" indicates Transaction ID. "secs" indicates a time (seconds) that is elapsed after obtaining an address designated by the client, in which the time is different from the lease time. "flags" indicates flags. For example, a broadcast flag is defined for designating that a client receives a response by broadcast. "ciaddr" indicates Client IP address, and "yiaddr" indicates 'your' (client) IP address. "siaddr" indicates an IP address of the server when performing DHCP offer or DHCP acknowledgement.

"giaddr" indicates Relay agent IP address, and "chaddr" indicates Client hardware address. "sname" indicates a server host name (character string), and "file" indicates Boot file name (character string). "options" indicates an Option field in which several options are included as necessary for each message type.

FIG. 12A-FIG. 12D show representative options. "Requested IP Address" shown in FIG. 12B is an IP address requested by the client. "IP Address Lease Time" shown in FIG. 12C indicates a lease time (seconds) of a provided address. The address is periodically updated at intervals of this time.

FIG. 12D shows DHCP Message Type in which a value in the "Type" field identifies a DHCP message type. Type=1 indicates DHCP Discover (client originating message), Type=2 indicates DHCP Offer (server originating message), Type=3 indicates DHCP Request (client originating message), Type=4 indicates DHCP Decline (client originating message), Type=5 indicates DHCP Ack (server originating message), Type=6 indicates DHCP NACK (server originating message), Type=7 indicates DHCP Release (client originating message) and Type=8 indicates DHCP Inform (client originating message).

The above-described formats are shown taking DHCPv4 as an example. Also for DHCPv6, although formats are different, similar update processes can be performed.

Fourth Embodiment

Figure 7:
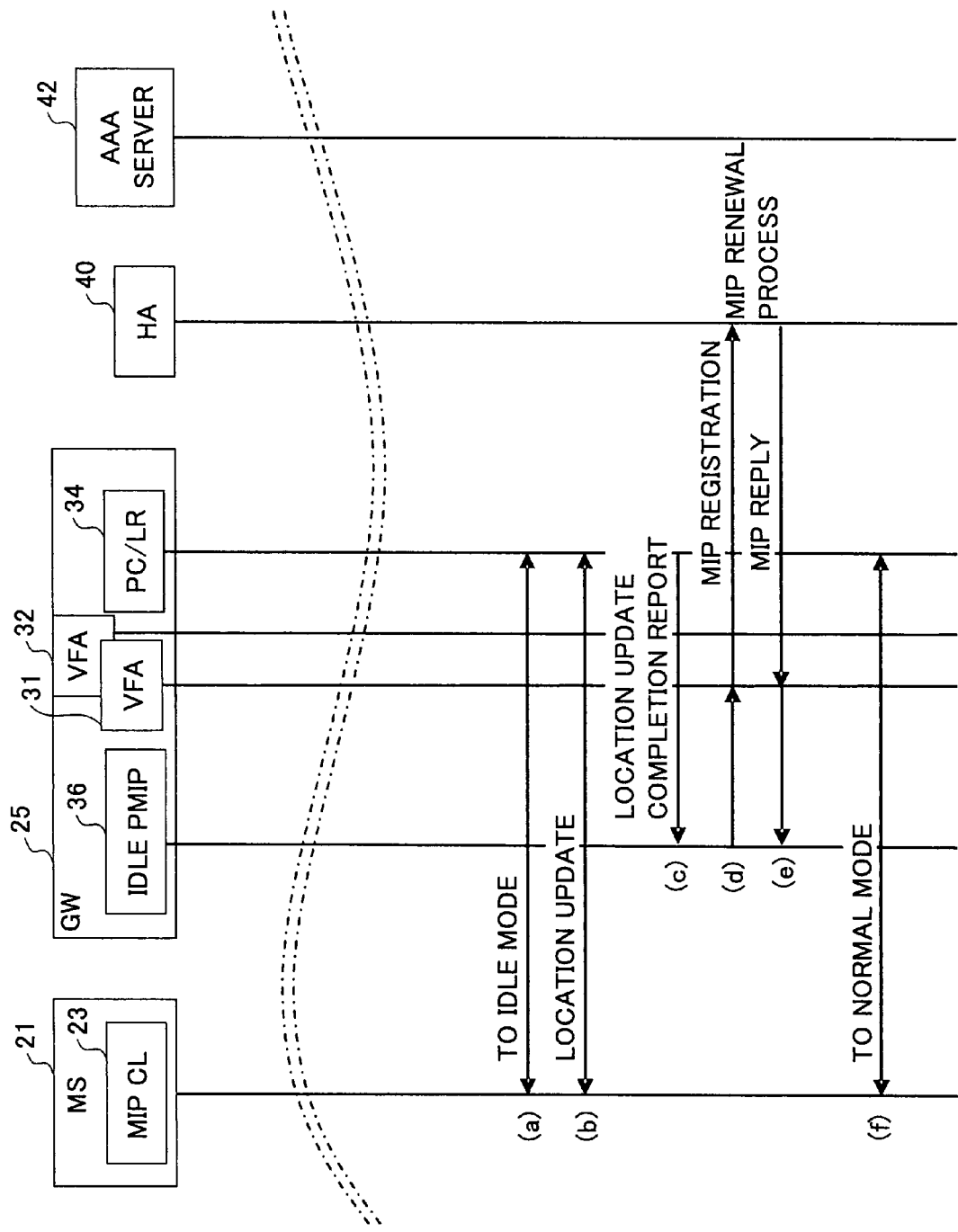
FIG. 7 is a sequence diagram of a fourth embodiment of the present invention.

FIG. 7 shows a sequence diagram of a forth embodiment of the present invention. This embodiment is different from the first embodiment in that the idle proxy client 35 performs the renewal process when periodic location update is performed instead of performing periodic renewal process based on the timer value of the idle proxy client 35.

According to the standard of IEEE 802.16e, a mobile station in the idle mode periodically performs location update. In the fourth embodiment, the idle proxy client 35 receives information indicating that the location update is performed from the PC/LR 34 so as to perform the renewal process. The idle proxy client 35 includes a location update completion detection unit.

By the way, for performing this process, it is at least necessary that interval of location updates is shorter than the update interval of the protocol that requires the periodic timer update process. As mentioned above, it depends on operation policy of the network whether the interval can be shorten.

In the following, this embodiment is described with reference to FIG. 7.

FIG. 7 shows a case where the mobile station is the MIP client 23. But, similar operation can be performed also when the mobile station 21 is a MIPv6 client or the mobile station 21 is a DHCP client. FIG. 7 shows processes from going into the idle mode to leaving the idle mode.

Step (a): In the same way as the first embodiment, the mobile station 21 goes into the idle mode.

Step (b): The mobile station 21 periodically performs location update. Detailed procedure of the location update is defined in standard specifications of IEEE 802.16e and WiMAX Forum NWG. Therefore, detailed procedure is not described in the specification.

Step (c): When location update succeeds, the PC/LR 34 sends a location update completion report to the idle PMIP 36. When DHCP is used, the report is sent to the idle PDHCP 37. The location update does not always succeed. For example, it fails because authentication fails. Only when location update succeeds, the PC/LR 34 sends the location update completion report.

Steps (d)-(e): The idle PMIP 36 receives the location update completion report and performs the MIP renewal process for the mobile station. When DHCP is used, the idle PDHCP 37 performs the DHCP renewal process for the mobile station 21.

By the way, even though the interval of the location update is set to be shorter than the update interval of the protocol that requires periodical timer update process, there is a possibility that the timer of the protocol that requires periodical timer update process is timed out earlier than the timer of the location update depending on the timing when the mobile station goes into the idle mode since the timer of the location update starts right after the mobile station goes into the idle mode.

For handling such a case, as to first renewal process after the mobile station goes into the idle mode, the idle PMIP 36 is provided with an idle mode start detection unit for performing the renewal process right after the mobile station goes into the idle mode. For DHCP, the idle PDHCP 37 is provided with an idle mode start detection unit.

In addition, in the same way as the first embodiment, only for the first renewal process after the mobile station goes into the idle mode, the renewal process may be performed based on timer value by obtaining an initial timer value. Also in this case, the renewal process after that is performed when the location update is performed.

Step (f): In the same way as the first embodiment, the mobile station 21 leaves the idle mode to go into the normal mode.

As mentioned above, since the idle proxy client 35 performs the renewal process based on the location update on behalf of the mobile station 21, it becomes unnecessary that the mobile station 21 once leaves the idle mode to go into the normal mode for performing the renewal process.

Fifth Embodiment

Figure 8:
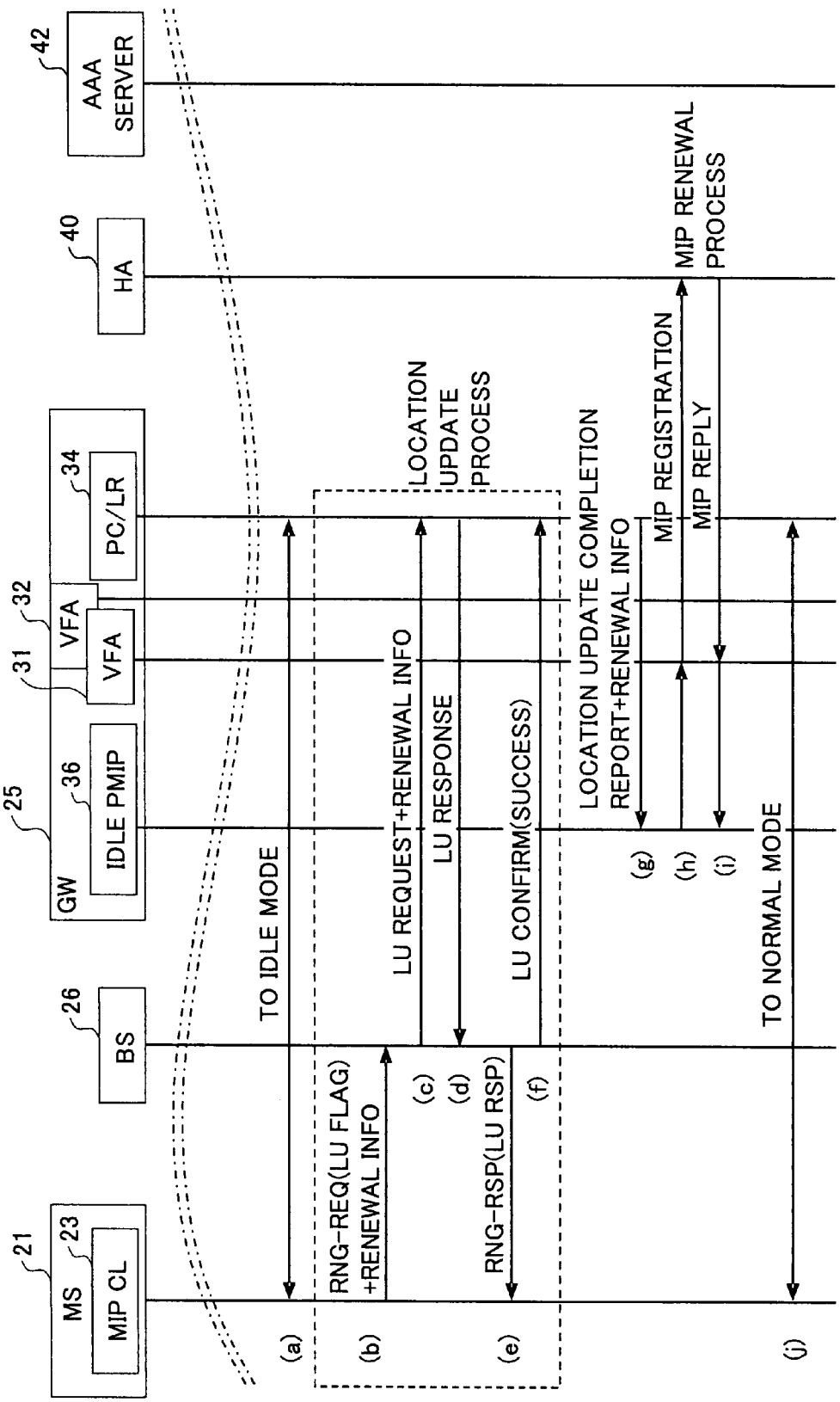
FIG. 8 is a sequence diagram of a fifth embodiment of the present invention.

FIG. 8 shows a sequence diagram of the fifth embodiment of the present invention. In this embodiment, in the same way as the fourth embodiment, the renewal process is performed when the periodical location update is performed. But, different from the fourth embodiment, messages of the location update defined in IEEE 802.16e are extended, so that the mobile station 21 can send information (renewal information) necessary for performing renewal process when performing the location update. The gateway 25 performs the renewal process based on the information.

FIG. 8 shows a base station (BS) 26 that is not shown in FIG. 7, so that messages between the mobile station 21 and the base station 26 and messages between the base station 26 and the gateway 25 can be shown in detail.

Steps (b)-(f) show the location update process in which the standard specification is extended. The standard specification of the IEEE 802.16e defines the interface between the mobile station and the base station. Interface between the base station and the gateway 25 is being standardized in WiMAX Forum NWG.

In the following, this embodiment is described with reference to FIG. 8.

FIG. 8 shows a case where the mobile station is the MIP client. But, similar operation can be performed also when the mobile station 21 is a MIPv6 client or the mobile station 21 is a DHCP client.

Step (a): In the same way as the first embodiment, the mobile station 21 goes into the idle mode.

Step (b): The mobile station 21 sends RNG-REQ (Location Update flag) based on the standard for performing location update. In the fifth embodiment, this message is extended so that renewal information can be also carried. There are two methods for extending the message. One method is enlarging parameters of the RNG-REQ. Another method is to define a new message so that the mobile station 21 sends the new message and RNG-REQ at the same time.

Step (c): The base station 26 sends a LU (Location Update) request defined in WiMAX Forum NWG to the PC/LR 34. In the fifth embodiment, the message is extended so that renewal information can be carried.

Step (d): The PC/LR 34 sends a LU response to the base station 26.

Step (e): The base station 26 responds to the mobile station by sending RNG-RSP (Location Update Response). At this time, the base station 26 performs message authentication for the RNG-REQ, and when it is finally authenticated, the base station 26 sends a LU confirm including a success flag to the PC/LR 34. The PC/LR 34 receives the message so that the location update process ends.

Step (g): In the same way as the fourth embodiment, the PC/LR 34 sends a location update completion report to the idle proxy client 35. In the fifth embodiment, the renewal information can be carried by the report.

Step (h)-(i): The idle proxy client 35 performs renewal process based on the received renewal information.

Step (j): In the same way as the first embodiment, the mobile station 21 leaves the idle mode to go into the normal mode.

As mentioned above, since the idle proxy client 35 performs the renewal process based on the location update, it becomes unnecessary that the mobile station 21 once leaves the idle mode to go into the normal mode for performing the renewal process.

FIG. 13A shows a message format of the RNG-REQ (LU flag)+Renewal Info. The RNG-REQ is determined in the standard IEEE802.16e and the message format used in this embodiment is basically conforms to the standard. In this embodiment, Renewal Info is added in a TLV Encoded Information field in the RNG-REQ defined by the standard.

As to MIPv4, for example, the Renewal Info includes information elements shown in FIG. 11A and FIG. 11C as necessary that are TLV-encoded. As to DHCPv4, the Renewal Info includes information elements shown in FIG. 12A and FIGS. 12B-12D as necessary that are TLV-encoded.

FIG. 13B shows a message format of the location update request+Renewal Info. The location update is being standardized in WiMAX Forum NWG, and the format of this embodiment basically conforms to the standard. In this embodiment, the Renewal Info is added to the TLV field in the location update request message.

In FIG. 13A, "Management Message Type" is 4. As a representative TLV parameter defined in the standard, "Ranging Purpose Indication" indicates Network Re-entry when Bit#0=value '1', and indicates Location Update when Bit#1=value '1' (LU flag). "Paging Controller ID" indicates ID of Paging Controller (PC).

In FIG. 13B, there are MS ID, BS ID and Anchor PC ID as representative TLV parameters of the Location Update Request (BS-GW) defined in the standard. As a TLV parameter added in this embodiment, Renewal Info is an information element necessary for sending a message of a protocol that requires updating process.

Sixth Embodiment

Figure 9:
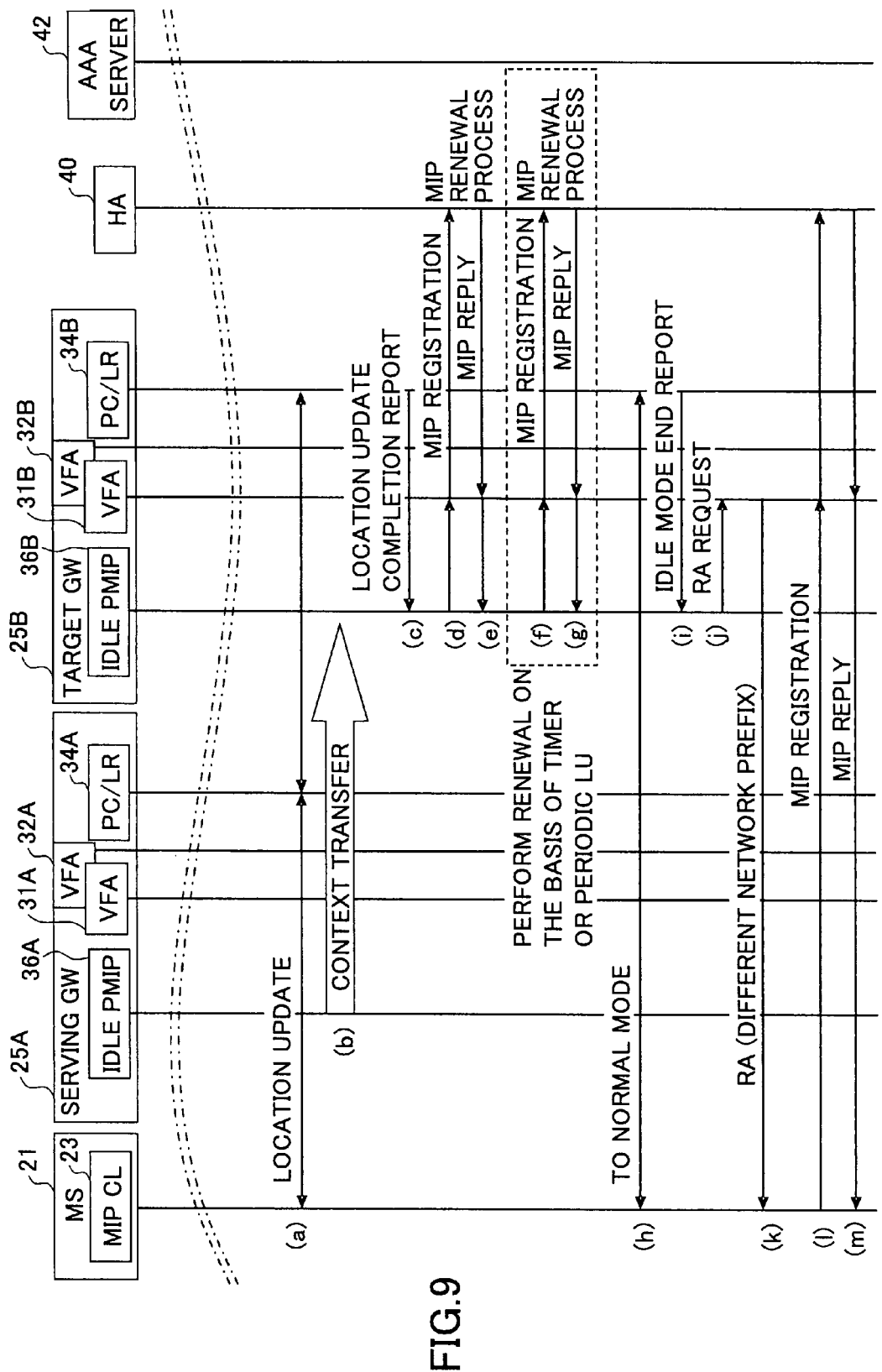
FIG. 9 is a sequence diagram of a sixth embodiment of the present invention.

FIG. 9 shows a sequence diagram of the sixth embodiment of the present invention. In this embodiment, the mobile station 21 in the idle mode moves between gateways spanning paging groups. A paging group is a range formed by a plurality of base stations, and is also referred to as a paging area. In the standard specification of IEEE 802.16e, when a mobile station in the idle mode moves over paging group, the mobile station 21 performs location update. Separately from this process, the mobile station 21 periodically performs location update as described in the fourth and fifth embodiments.

When moving between paging groups, there is a case where the mobile station 21 performs relocation of FA/AR when the mobile station 21 moves from a gateway to another gateway. In the relocation, along with movement of the mobile station 21, a gateway 25A providing a service to the mobile station 21 is changed to another gateway 25B. More particularly, when the mobile station 21 resides under the gateway 25A, the VFA 31A or the VAR 61A in the gateway 25A provides its service to the mobile station 21. Then, after the movement of the mobile station 21, the VFA 31B or the VAR 61B in another gateway 25B provides the service to the mobile station 21.

It depends on implementation or operation policy of the network whether relocation of FA/AR is performed. In a system where relocation of FA/AR is not performed, the renewal process can be performed in the same way as the fourth or fifth embodiment. In this sixth embodiment, a case where relocation is performed is described.

In FIG. 9, the mobile station 21 moves from an area under the gateway 25A (to be referred to as serving gateway 25A) to an area under the gateway 25B (to be referred to as target gateway 25B). Each reference symbol of blocks in the serving gateway 25A is provided with "A" at the end of the symbol (idle PMIP 36A, for example). Each reference symbol of blocks in the target gateway 25B is provided with "B" at the end of the symbol (idle PMIP 36B, for example).

In the sixth embodiment, along with the movement of the mobile station 21 in the idle mode, context is transferred from the idle PMIP 36A to the idle PMIP 36B. After that, the idle PMIP 36B performs the renewal process for the mobile station 21. The "context" is information such as an address, a timer value and the like for the mobile station 21.

In the same way as the first embodiment, after the mobile station 21 returns to the normal mode, the VFA 31B advertises router advertisement information so that timer synchronization of timers is realized.

In the following, this embodiment is described with reference to FIG. 9. FIG. 9 shows a case where the mobile station 21 is the MIP client 23. But, similar operation can be performed also when the mobile station 21 is a MIPv6 client or the mobile station 21 is a DHCP client.

Step (a): Along with movement, the mobile station 21 performs location update. In the location update, it is determined whether relocation of FA/AR is performed. In the present embodiment, it is determined that relocation is to be performed.

Step (b): The context is transferred from the serving-idle PMIP 36A to the target-idle PMIP 36B. This context transfer may be performed in step (b) or may be performed in the after-mentioned step (d).

Step (c): The PC/LR 34B sends a location update completion report to the idle PMIP 36B. In the example shown in FIG. 9, the target-PC/LR 34B sends the location update completion report. This is because relocation from the PC/LR 34A to the PC/LR 34B is performed. When relocation is not performed, the serving-PC/LR 34A sends the location update completion report. Relocation of FA/AR is independent from relocation of PC/LR 34. For example, there is a possibility that relocation of FA/AR is performed, but relocation of PC/LR 34 is not performed.

Step (d)-(e): The idle PMIP 36B performs the renewal process based on the location update completion report. Either one of the VFA 31B and the VFA 32B mediates the MIP registration/reply messages.

Steps (f)-(g): Separately from the above-mentioned steps (d)-(e), the idle proxy client 35B performs the renewal process based on its own timer or periodic LU (location update). Whether the renewal process is performed based the timer or the periodic LU depends on which embodiment is adopted from the above-mentioned embodiments.

Step (h): In the same way as the first embodiment, the mobile station 21 leaves the idle mode to go into the normal mode.

Step (i): In the same way as the first embodiment, the PC/LR 34B sends an idle mode completion report to the idle PMIP 36B.

Step (j): The idle PMIP 36 requests the target-VFA 31B (shown in FIG. 9) or the target-VFA 32B to advertise router advertisement information. Since each of the target-VFA 31B and the target VFA 32B advertises a network prefix different from one of the serving-VFAs 31A and 32A, any of them can be used.

Step (k): In the same way as the first embodiment, the target-VFA 31B advertises router advertisement information having a different network prefix.

Steps (l)-(m): The mobile station 21 that receives the router advertisement information having the different network prefix performs the renewal process so that timer synchronization is realized.

As mentioned above, it becomes unnecessary that the mobile station 21 once leaves the idle mode to go into the normal mode for performing the renewal process even in a case where the mobile station 21 in the idle mode moves from a paging group to another paging group.

Seventh Embodiment

Figure 10:
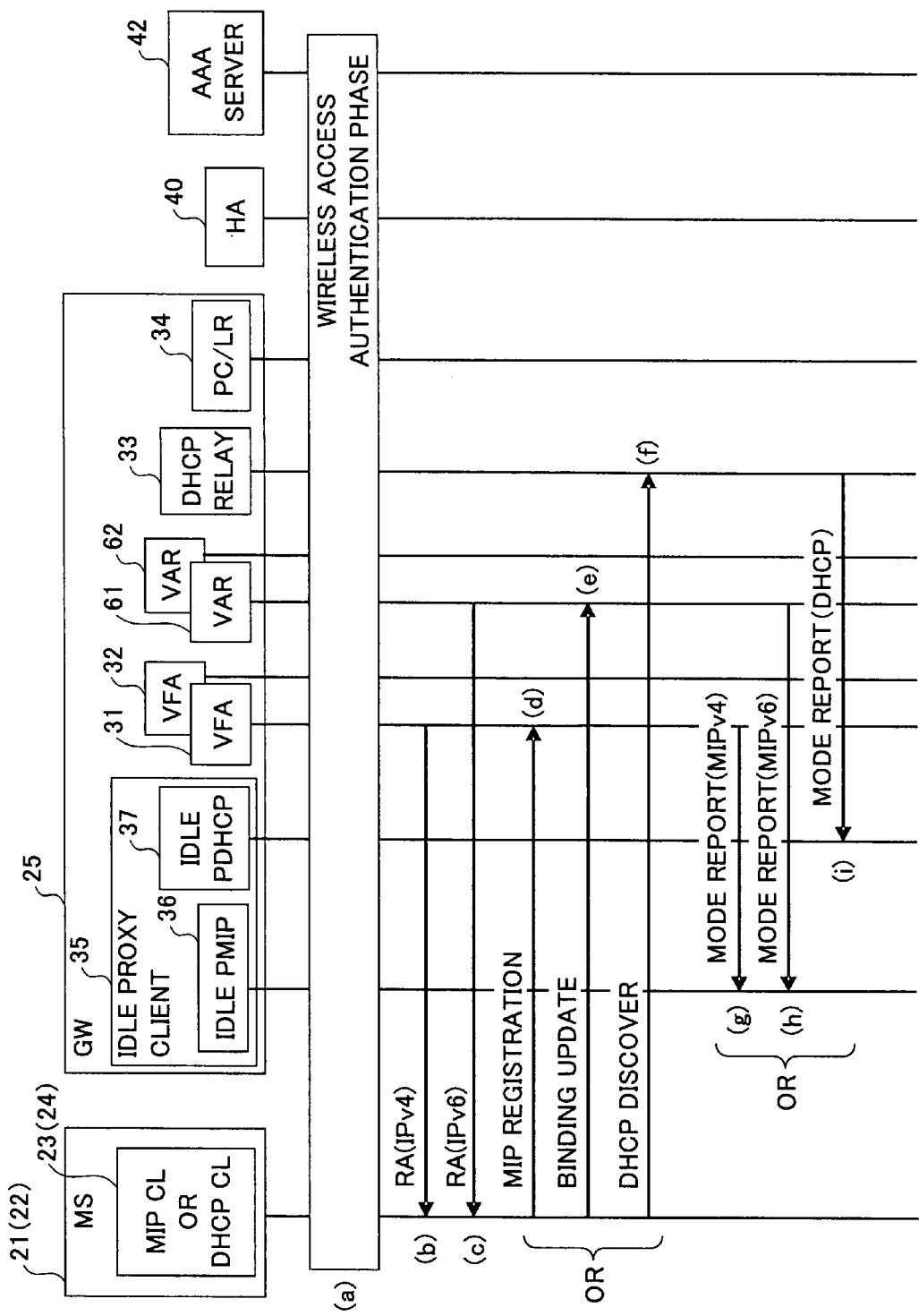
FIG. 10 is a sequence diagram of a seventh embodiment of the present invention.

FIG. 10 is a sequence diagram of the seventh embodiment of the present invention. In this embodiment, it is determined whether the mobile station 21 (or 22) is the MIP client 23 or the DHCP client 24. When it is determined to be the MIP client 23, MIP renewal process is performed on behalf of the mobile station 21, and when it is determined to be the DHCP client 24, DHCP renewal process is performed. This embodiment is not necessary in operation environment where only one of the MIP client 23 and the DHCP client 24 is used.

In the seventh embodiment, after the wireless access authentication phase is performed, the gateway 25 sends router advertisement information (IPv4) and router advertisement information (IPv6) to the mobile station 21. Then, the gateway 25 determines whether the mobile station 21 is a MIP client or a DHCP client based on a response message from the mobile station 21 (or 22). Then, the gateway 25 reports the determination result to the idle proxy client 35. Thus, the idle proxy client includes a client determination unit.

In the following, this embodiment is described with reference to FIG. 10.

Step (a): Wireless access authentication phase defined in WiMAX is performed.

Step (b)-(c): The gateway 25 advertises router advertisement information (IPv4) and router advertisement information (IPv6).

Steps (d)-(f): The mobile station 21 (or 22) sends one of a MIP registration, a binding update and a DHCP discover according to whether the mobile station 21 is the MIPv4 client 23, the MIPv6 client or the DHCP client 24.

Steps (g)-(i): As shown in FIG. 10, as to MIP registration, it is received by the VFA 31 (or 32) and the VFA 31 (or 32) sends a mode report (MIPv4) to the idle PMIP 36. As to binding update, it is received by the VAR 61 (or 62) and the VAR 61 (or 62) sends a mode report (MIPv6) to the idle PMIP 36. As to the DHCP discover, it is received by the DHCP relay 33 and the DHCP relay 33 sends a mode report (DHCP) to the idle PDHCP 37.

After that, the renewal process is performed as mentioned in the before-mentioned embodiments.

Accordingly, it is determined whether the mobile station 21 (or 22) is the MIP client 36 or the DHCP client 37 so that renewal process can be performed suitably for the mobile station.

As described above, according to the embodiments of the present invention, a relay apparatus for managing a base station that connects to a mobile station by wireless is provided. The relay apparatus includes: an idle mode detection unit configured to detect that the mobile station is in an idle mode; a renewal execution unit configured to execute a renewal process on behalf of the mobile station in the idle mode by communicating messages necessary for the renewal process with a server; and a timer synchronization unit configured to synchronize timers of the mobile station and the server after the mobile station returns to a normal mode from the idle mode.

The relay apparatus may further includes: a location update completion detection unit configured to detect completion of location update performed by the mobile station in the idle mode, wherein the renewal execution unit sends and receives the messages necessary for the renewal process when completion of the location update is detected.

The relay apparatus may further includes an initial timer value obtaining unit configured to obtain a timer value before the mobile station goes into the idle mode, wherein the renewal execution unit sends and receives the messages necessary for the renewal process based on the timer value.

In the relay apparatus, the renewal execution unit may send and receive MIP registration/reply messages as the messages necessary for the renewal process. Also, the renewal execution unit may send and receive binding update/acknowledgement messages as the messages necessary for the renewal process.

In the relay apparatus, the timer synchronization unit may synchronize the timers of the mobile station and the server by requesting an agent to advertise router advertisement information wherein a network prefix of the agent is different from a network prefix of another agent to which the mobile station sends the MIP registration message. Also, the timer synchronization unit may synchronize the timers of the mobile station and the server by requesting an access router to advertise router advertisement information wherein a network prefix of the access router is different from a network prefix of another access router to which the mobile station sends the binding update message.

In the relay apparatus, the relay apparatus may further include a MIP key obtaining unit configured to obtain a MIP key in a wireless access authentication phase. The MIP key obtaining unit may obtain the MIP key from a home agent. Also, the MIP key obtaining unit may obtain the MIP key from an AAA server.

In the relay apparatus, the renewal execution unit may send and receive DHCP request/acknowledgement messages as the messages necessary for the renewal process.

In the relay apparatus, the timer synchronization unit may synchronize timers of the mobile station and the server by requesting an agent to advertise router advertisement information wherein a network prefix of the agent is different from a network prefix of an address provided to the mobile station. Also, the timer synchronization unit may synchronize timers of the mobile station and the server by requesting an access router to advertise router advertisement information wherein a network prefix of the access router is different from a network prefix of an address provided to the mobile station. In addition, the timer synchronization unit may synchronize timers of the mobile station and the server by sending a DHCP negative acknowledgment message to the mobile station.

In the relay apparatus, a message for the location update may be extended to carry information necessary for the renewal process. Also, when the mobile station moves from a paging group to another paging group, the relay apparatus may transfer information related to the mobile station in the idle mode to a relay apparatus that covers the mobile station after the mobile station moves.

The relay apparatus may further include a client determination unit configured to advertise router advertisement information to the mobile station so as to determine a client type of the mobile station based on a response message from the mobile station.

According to the embodiments of the present invention, it becomes unnecessary that the mobile station once leaves the idle mode to go into the normal mode for performing the renewal process since the gateway that is a relay apparatus performs the renewal process. Thus, consumed power of the mobile station and wireless resources can be reduced.

The present invention is not limited to the specifically disclosed embodiments, and variations and modifications may be made without departing from the scope of the present invention.

The present application contains subject matter related to Japanese patent application No. 2006-206880, filed in the JPO on Jul. 28, 2006, the entire contents of which are incorporated herein by reference.

What is claimed is:

1. A relay apparatus for managing a base station that connects to a mobile station by wireless, the relay apparatus comprising:
   an idle mode detection unit configured to detect that the mobile station is in an idle mode;
   a renewal execution unit configured to execute a renewal process on behalf of the mobile station in the idle mode by communicating messages necessary for the renewal process with a server, the renewal process updating a timer of the server; and
   a timer synchronization unit configured to synchronize a timer value of a timer of the mobile station and a timer value of the timer of the server updated by the renewal process after the mobile station returns to a normal mode from the idle mode, the timer value of the timer of the mobile station and the timer value of the timer of the server updated by the renewal process being different from each other before being synchronized.

2. The relay apparatus as claimed in claim 1, the relay apparatus further comprising:
a location update completion detection unit configured to detect completion of location update performed by the mobile station in the idle mode,
wherein the renewal execution unit sends and receives the messages necessary for the renewal process when completion of the location update is detected.

3. The relay apparatus as claimed in claim 2, wherein the relay apparatus extends a message for the location update to carry information necessary for the renewal process.

4. The relay apparatus as claimed in claim 1, the relay apparatus further comprising:
an initial timer value obtaining unit configured to obtain an initial timer value before the mobile station goes into the idle mode,
wherein the renewal execution unit sends and receives the messages necessary for the renewal process based on the initial timer value.

5. The relay apparatus as claimed in claim 1, wherein the renewal execution unit sends and receives MIP registration/reply messages as the messages necessary for the renewal process.

6. The relay apparatus as claimed in claim 5, wherein the timer synchronization unit synchronizes the timer values of the timers of the mobile station and the server by requesting an agent to advertise router advertisement information wherein a network prefix of the agent is different from a network prefix of another agent to which the mobile station sends the MIP registration message.

7. The relay apparatus as claimed in claim 5, the relay apparatus further comprising a MIP key obtaining unit configured to obtain a MIP key in a wireless access authentication phase.

8. The relay apparatus as claimed in claim 7, wherein the MIP key obtaining unit obtains the MIP key from a home agent.

9. The relay apparatus as claimed in claim 7, wherein the MIP key obtaining unit obtains the MIP key from an AAA server.

10. The relay apparatus as claimed in claim 1, wherein the renewal execution unit sends and receives binding update/acknowledgement messages as the messages necessary for the renewal process.

11. The relay apparatus as claimed in claim 10, wherein the timer synchronization unit synchronizes the timer values of the timers of the mobile station and the server by requesting an access router to advertise router advertisement information wherein a network prefix of the access router is different from a network prefix of another access router to which the mobile station sends the binding update message.

12. The relay apparatus as claimed in claim 1, wherein the renewal execution unit sends and receives DHCP request/acknowledgement messages as the messages necessary for the renewal process.

13. The relay apparatus as claimed in claim 12, wherein the timer synchronization unit synchronizes the timer values of the timers of the mobile station and the server by requesting an agent to advertise router advertisement information wherein a network prefix of the agent is different from a network prefix of an address provided to the mobile station.

14. The relay apparatus as claimed in claim 12, wherein the timer synchronization unit synchronizes the timer values of the timers of the mobile station and the server by requesting an access router to advertise router advertisement information wherein a network prefix of the access router is different from a network prefix of an address provided to the mobile station.

15. The relay apparatus as claimed in claim 12, wherein the timer synchronization unit synchronizes the timer values of the timers of the mobile station and the server by sending a DHCP negative acknowledgment message to the mobile station.

16. The relay apparatus as claimed in claim 1, wherein, when the mobile station moves from a paging group to another paging group, the relay apparatus transfers information related to the mobile station in the idle mode to a relay apparatus that covers the mobile station after the mobile station moves.

17. The relay apparatus as claimed in claim 1, the relay apparatus further comprising a client determination unit configured to advertise router advertisement information to the mobile station so as to determine a client type of the mobile station based on a response message from the mobile station.

18. A relay method performed in a relay apparatus for managing a base station that connects to a mobile station by wireless, the relay method comprising:
detecting that the mobile station is in an idle mode;
executing a renewal process on behalf of the mobile station in the idle mode by communicating messages necessary for the renewal process with a server, the renewal process updating a timer of the server; and
synchronizing a timer value of a timer of the mobile station and a timer value of the timer of the server updated by the renewal process after the mobile station returns to a normal mode from the idle mode, the timer value of the timer of the mobile station and the timer value of the timer of the server updated by the renewal process being different from each other before being synchronized.

* * * * *